Nov. 30, 1937. E. L. WIEGAND Re. 20,566

ELECTRICAL HEATING UNIT

Original Filed Nov. 16, 1933

Edwin L. Wiegand
INVENTOR
By Freeman, Sweet, Albrecht and Weidman
ATTORNEYS

Reissued Nov. 30, 1937

Re. 20,566

UNITED STATES PATENT OFFICE 20,566

ELECTRICAL HEATING UNIT

Edwin L. Wiegand, Pittsburgh, Pa.

Original No. 1,994,676, dated March 19, 1935, Serial No. 698,323, November 16, 1933. Application for reissue July 29, 1935, Serial No. 33,743

11 Claims. (Cl. 219—25)

Figure 1:
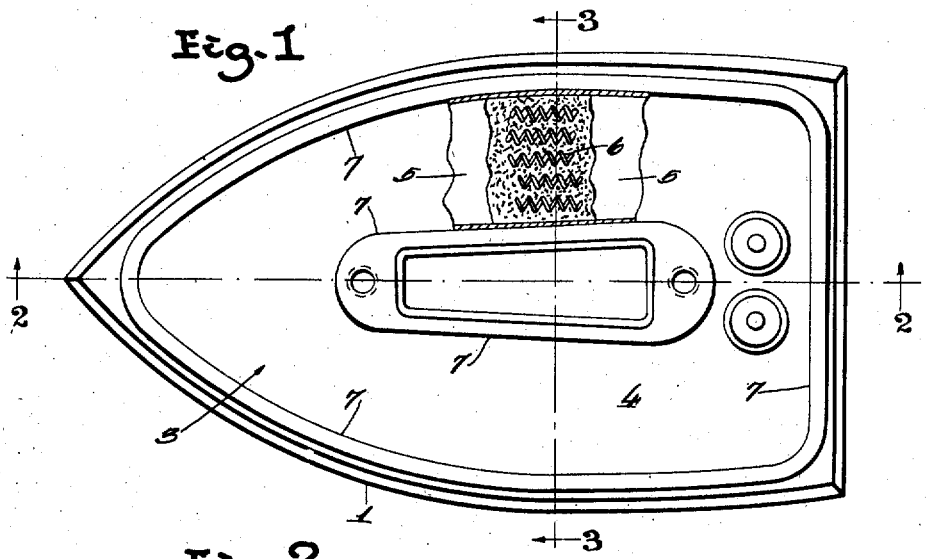

This invention relates to electrical heating units particularly irons, hot plates, cooking utensils and in fact any type of electrical heating apparatus employing an electrical resistance heating element.

One of the main objects of the invention is to provide a heating unit in which it is practical to manufacture the heated member or sole plate and the heating element in different localities and to then assemble the same.

Another object of the invention is to provide a heating device of the character described in which the heating element and the heated member are intimately connected thermally and mechanically.

Another object of the invention is to provide a heating unit of the character described having a heated member and an electrical resistance heating element which are intimately connected together by means of a thin layer of cement having a high coefficient of thermal conductivity whereby a mechanical and thermal bond is formed between the heated member and the heating element.

Another object of the invention is to provide a heating unit of the character described employing an electrical resistance heating element in the form of a partially sheathed unit which is provided with a heat insulating or obstructing member which is disposed between the sheath and the resistance element, the heating element having one face open or unsheathed and disposed in intimate contact with the body to be heated.

It is old in the art to provide a heating device such as an iron in which the resistor is embedded or molded directly into the base of the iron or hot plate. This type of unit is objectionable as the heating element or resistor must be embedded in a cast base before the base has been suitably finished by polishing and plating. In such case, it is also necessary to ship the cast iron base complete with the heating element therein which involves considerable expense; and it is necessary thereafter to suitably finish the parts for the market which involves the liability of damage to the base and heating element. To avoid these difficulties, attempts have been made to manufacture the heating units of this type by first finishing the cast iron or other heavy metal base and then embedding the element directly therein, in which case it becomes necessary to eliminate the baking of the heating element at a high temperature, which baking is quite desirable in the production of heating elements in which the resistor is embedded in bonded granular refractory material. It is not practical to bake the heating element after it has been placed in the iron as the finishing and plating will be likely to become scratched and burned when subjected to the high temperature necessary to bake the heating element.

According to my method, I first produce the refractory embedded heating element which is baked at a high temperature. The cast base is produced separately preferably in a locality as near as possible to the point of assembly, the heating elements proper being produced at a central plant specializing therein. The heating element itself is protected by a light weight sheet metal sheath which is shaped and designed to fit closely in a recess which is provided in the base or sole plate of the electric iron or hot plate to be produced. When both the sole plate and the heating element have been completed and delivered to the point of assembly the inside of the recess in the sole plate is first coated with a thin layer of high refractory heat conducting cement having a high coefficient of thermal conductivity. The heating element proper is then pressed into the recess by means of a press and suitable platens. The coating of cement forms a strong mechanical and thermal bond between the heating element and the base. The excess cement is squeezed out around the edges of the element and a unit is created which is very neat in appearance and has all of the required characteristics of mechanical and thermal integration. The electrical parts are effectively shielded against moisture and mechanical injury and the heating element is disposed with its open face in intimate contact with the surface to be heated. After the heating element is secured in place as described, the assembly is baked in an oven at a sufficiently high temperature and for a sufficient time to drive out the moisture and to improve the bonding action of the cement but without destroying the finish. It will thus be seen that the resulting structure will consist of a resistor which is embedded in a highly compacted mass of bonded granular refractory material and baked at a higher temperature than would be possible if the element were embedded directly in a highly finished base. After the electrical heating element and base have been assembled, it is not practical to heat them to a high oxidizing temperature so that the bonding cement will not have the highest electrical insulating value, yet the refractory insulating material immediately about the resistor is of a high order due to having been pressed and previously baked at a high temperature. Moreover, there will be no air space between the face of the heating element and the surface to be heated.

Figure 2:
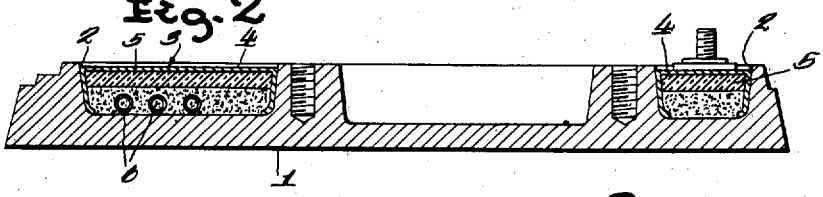
Figure 3:
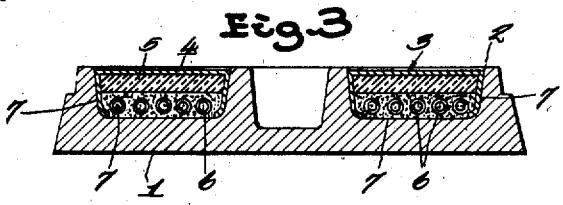
Figure 4:
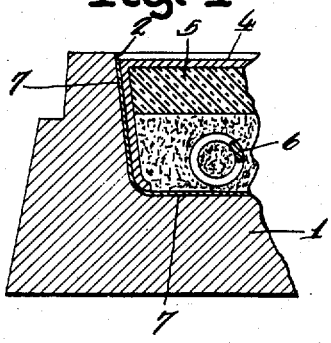
Figure 5:
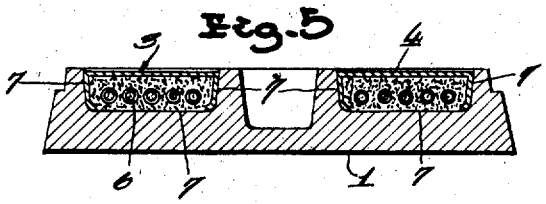

Further and more limited objects of the invention will appear as the description proceeds and by reference to the accompanying drawing in which Fig. 1 is a top plan view of part of an iron constructed in accordance with my invention and having parts broken away to show the heating element; Fig. 2 is a vertical sectional view on the line 2—2 of Fig. 1; Fig. 3 is a vertical sectional view on the line 3—3 of Fig. 1; Fig. 4 is an exaggerated fragmentary sectional view showing the layer of cement between the heating element proper and the walls of the recess in the base of the iron; and Fig. 5 is a vertical sectional view of a slightly modified form of the invention in which the heat insulating and directing member is omitted.

Referring now to the drawing the reference character 1 designates the base of an electrically heated iron which is provided with a recess 2 which extends about the iron. The bottom of the recess 2 is preferably flat and the side walls thereof have a slightly downward taper. Fitting within the recess 2 is an electrical resistance heating element 3 which is of substantially the same shape as the recess and fits tightly therein. The heating element proper consists of a thin sheet metal sheath 4 which is shaped in section as shown most clearly in Figs. 2, 3, and 4, and in which is arranged a slab 5 of heat insulating and directing material. Also arranged within the sheath 4 is a coiled electrical resistor 6 which consists of a plurality of helically wound coils arranged as shown most clearly in Figs. 1 and 2 and which are embedded in a mass of bonded, granular tightly compacted, refractory material which is baked at a high temperature. The sides of the sheath are turned over inwardly and embedded in the mass of refractory material so as to be flush with the face thereof. It will also be noted that the resistor is positioned closely adjacent the heating face of the element. In practice the layer of granular refractory insulating material between the resistor and the face of the element is approximately .050 of an inch but may vary from 3/64 of an inch to $\frac{1}{16}$ of an inch, depending upon the character of the heating unit. Disposed between the heating element proper and the walls of the recess 2 is a thin layer 7 of cement having a high coefficient of thermal conductivity and which forms a mechanical and thermal bond between the heating element proper and the walls of the recess. This layer of cement is very thin and just sufficient to make a bond without unduly increasing the space between the resistor and the metal surface to be heated. Before the element is placed within the recess, the recess is first coated with a thin layer of cement and of approximately $\frac{1}{32}$ of an inch in thickness and in a plastic or semi-fluid condition. The element is then pressed frictionally into the recess and the excess cement is forced out around the edges of the element so as to leave only a sufficient amount of the cement to fill any irregularities or small air pockets.

The layer 5 of heat insulating material is refractory heat insulating material of the highest possible compressive strength so that its cellular or other heat obstructing character will not be unduly impaired in the process of compressing the element. Such materials are obtainable in the market in the form of artificial refractory slabs of cellular construction which have considerable resistance to compression and tend to preserve the heat insulating value even though considerable pressure is applied to the heating element. This layer of heat insulating material is interposed between the inner surface of the sheet metal sheath and one side of the heat generating element or resistor in such a manner that the heating element or resistor proper is still completely surrounded by an electrical insulating heat conducting material, which facilitates the emission of heat from the resistor proper by conduction and permitting ready lateral diffusion and equalization of heat between the various convolutions of the resistor element thereby avoiding hot streaks and high temperature local fusion points which would be the case if the resistor were, as is sometimes done, laid into grooves of refractory supporting material having other than the best heat conducting qualities. The resistor may be in the form of a ribbon wound in any suitable form but is shown in the drawing as in the form of a small helix and lies very near to the face of the element.

I have found from experience that at the higher energy densities anything interposed between a heat source and a member which is to receive heat therefrom impedes the transfer of heat, even though the interposed member or material have the highest heat transferring qualities. It will be seen from my construction that the open or unsheathed portion of the heating element is pressed firmly in place and that there is interposed only the very slightest layer of cement which forms a thermal and mechanical bond between the heating unit proper and the heater base. It will also be seen that due to the construction hereinbefore described, there is no air space between the face of the heating element and the surface of the member to be heated.

In Fig. 5 there is disclosed a slightly modified form of my invention in which the layer 5 of heat insulating and directing material is omitted. In other respects this form of the invention is identical with that disclosed in the remaining figures.

It will now be clear that I have provided an electrical resistance heating unit which will accomplish the objects of the invention as hereinbefore stated. It is to be understood that the embodiment of the invention herein disclosed is merely illustrative and is not to be considered in a limiting sense as the invention is limited only in accordance with the scope of the appended claims.

Having thus described my invention, what I claim is:

1. In an electrical heating unit, the combination of a sole plate having a recess therein, a heating element fitting within said recess, said heating element including a resistor embedded in refractory heat conducting material and enclosed within a sheath having an open face, a thin layer of cement having a high coefficient of thermal conductivity disposed between the open face of the heating element and the bottom of the recess and bonded therewith.

2. In an electrical heating unit, the combination of a sole plate having a recess therein, a heating element fitting within said recess, said heating element including a resistor embedded in refractory heat conducting material and enclosed within a sheath having an open face, a thin layer of cement having a high coefficient of thermal conductivity disposed between the open face of the heating element and the bottom of the recess and bonded therewith, and a layer of heat insulating material disposed between the resistor and the sheath and serving to direct the heat toward the face of the element.

3. In an electrical heating unit, the combination of a heated member having a recess therein, an electrical resistance heating element fitting within said recess and including an electrical resistor embedded in a mass of refractory heat conducting material enclosed within a sheath having an open face, a thin layer of cement having a high coefficient of thermal conductivity disposed between the open face of the heating element and the bottom of said recess and forming a thermal and mechanical bond therewith.

4. In an electrical heating unit, the combination of a heated member having a recess therein, an electrical resistance heating element disposed within said recess, a thin layer of cement disposed between the heating face of the element and walls of the recess and forming a mechanical and thermal bond therebetween, and a metal sheath enclosing said heating element except for the heating face thereof.

5. In an electrical heating unit, the combination of a heated member having a recess therein, an electrical resistance heating element fitting within said recess and comprising a metal sheath in which is arranged one or more coils of wire embedded in a mass of refractory heat conducting material, said sheath having an open face and having its edges turned inwardly and embedded in the refractory material, and a layer of cement covering the face and sides of said heating element and providing a mechanical and thermal bond between the heating element and the walls of said recess.

6. In an electrical heating unit, the combination of a heated member having a recess therein, an electrical resistance heating element fitting within said recess and comprising a metal sheath in which is arranged one or more coils of wire embedded in a mass of refractory heat conducting material, said sheath having an open face and having its edges turned inwardly and embedded in the refractory material, and a layer of cement covering the heating face and sides of said heating element and providing a mechanical and thermal bond between the heating element and the walls of said recess, the resistor being disposed closely adjacent the open face of the heating element.

7. In an electrical heating unit, the combination of a heated member having a recess therein, an electrical resistance heating element fitting within said recess and comprising a metal sheath in which is arranged one or more coils of wire embedded in a mass of refractory heat conducting material, said sheath having an open face, a layer of cement covering the face and sides of said heating element and providing a mechanical and thermal bond between the heating element and the walls of said recess, the resistor being disposed closely adjacent the open face of the heating element, and a heat deflecting member disposed between the sheath and the open face of the element.

8. In an electrical heating unit, the combination of a heated member having a recess therein, an electrical resistance heating element disposed within said recess, a layer of cement disposed between a heating surface of said element and a wall of said recess and forming a mechanical and thermal bond therebetween, and a metal sheath forming a surface of said heating element other than said heating surface.

9. An electrical heating unit, comprising: a heated member having a recess therein; an electrical resistance heating element disposed in said recess; said heating element including a resistor embedded in a mass of refractory electrically insulating heat conducting material presenting a free heating surface; a layer of cement disposed between said otherwise free heating surface and a wall of said recess and forming a mechanical and thermal bond therebetween; and a metal sheath forming a surface of said heating element other than said heating surface.

10. In an electrical heating unit, the combination of a heated member having a recess therein, an electrical resistance heating element disposed in said recess, said heating element having side surfaces adjacent the side walls of said recess and having a heating surface adjacent the bottom wall of said recess, a layer of cement disposed between said heating surface of said element and the bottom wall of said recess and forming a mechanical and thermal bond therebetween, and metal sheath means forming surfaces of said heating element excepting at least said heating surface but including at least the side surfaces of said heating element.

11. In an electrical heating unit, the combination of a heated member having a recess therein, an electrical resistance heating element disposed in said recess, a layer of cement disposed between a heating surface of said element and a wall of said recess and forming a mechanical and thermal bond therebetween, a metal sheath forming a surface of said heating element other than said heating surface, and a body of heat insulating material forming a part of said heating element and disposed at the side of said heating element opposite from said heating surface thereby to increase the flow of heat toward said heating surface.

EDWIN L. WIEGAND.